United States Patent [19]

McCabe et al.

[11] Patent Number: 5,558,130
[45] Date of Patent: Sep. 24, 1996

[54] PIPE STOPPER HAVING A GUIDE MEMBER TO ASSIST IN GUIDING THE STOPPER AROUND A BEND IN A PIPE

[75] Inventors: Martin B. McCabe, Bromley; Anthony C. Saunders, Newdigate, both of United Kingdom

[73] Assignee: Synthotech Marine Limited, Thronton Heath, United Kingdom

[21] Appl. No.: 244,854

[22] PCT Filed: Nov. 12, 1992

[86] PCT No.: PCT/GB92/02097

§ 371 Date: Jun. 16, 1994

§ 102(e) Date: Jun. 16, 1994

[87] PCT Pub. No.: WO93/12368

PCT Pub. Date: Jun. 24, 1993

[30] Foreign Application Priority Data

Dec. 18, 1991 [GB] United Kingdom .................. 9126879
Feb. 12, 1992 [GB] United Kingdom .................. 9202918

[51] Int. Cl.$^6$ ............................................ F16L 55/12
[52] U.S. Cl. ................................... 138/89; 138/98
[58] Field of Search ................... 138/89, 90, 94, 138/97, 98

[56] References Cited

U.S. PATENT DOCUMENTS

| | | | |
|---|---|---|---|
| 1,747,933 | 2/1930 | Goodman et al. | 138/94 |
| 1,966,819 | 7/1934 | Irvin | 138/89 |
| 2,107,259 | 2/1938 | Hazel | 138/89 |
| 2,299,365 | 10/1942 | Valuch . | |
| 2,588,188 | 3/1952 | Weisman | 138/94 |
| 3,015,469 | 1/1962 | Falk | 138/89 |
| 3,763,896 | 10/1973 | Horne et al. | 138/89 |
| 4,462,430 | 7/1984 | Anthony et al. | 138/89 |
| 4,715,747 | 12/1987 | Behrens | 138/97 |
| 5,213,727 | 5/1993 | Gargiulo | 138/97 |
| 5,282,494 | 2/1994 | Elgar et al. | 138/97 |

FOREIGN PATENT DOCUMENTS

| | | | |
|---|---|---|---|
| 0497043 | 8/1992 | European Pat. Off. . | |
| 928969 | 6/1963 | United Kingdom . | |
| 2040459 | 8/1980 | United Kingdom | 138/89 |
| 2236158 | 3/1991 | United Kingdom . | |
| 2252383 | 8/1992 | United Kingdom . | |

*Primary Examiner*—James E. Bryant, III
*Attorney, Agent, or Firm*—Oliff & Berridge

[57] ABSTRACT

A pipe stopper capable of moving along a pipe to block the pipe at a point remote from an access point. The pipe stopper comprises an elongate resilient body member provided with a resilient reinforcing member. A plurality of circumferential sealing members are spaced along the length of the body member and seals the pipe stopper to the pipe. A guide member extends from the front or leading end of the pipe stopper and guides the pipe stopper around a bend and/or elbow in the pipe. The pipe stopper may be part of a pipe stopper system for placing the pipe stopper at a point remote from an access point and for subsequently retrieving the pipe stopper.

17 Claims, 12 Drawing Sheets

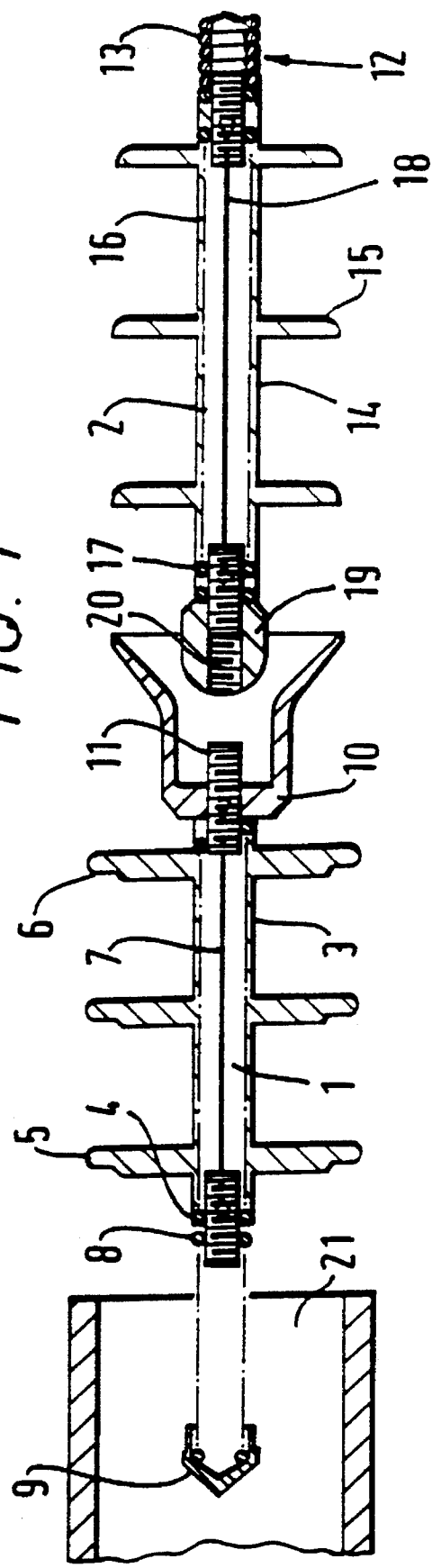
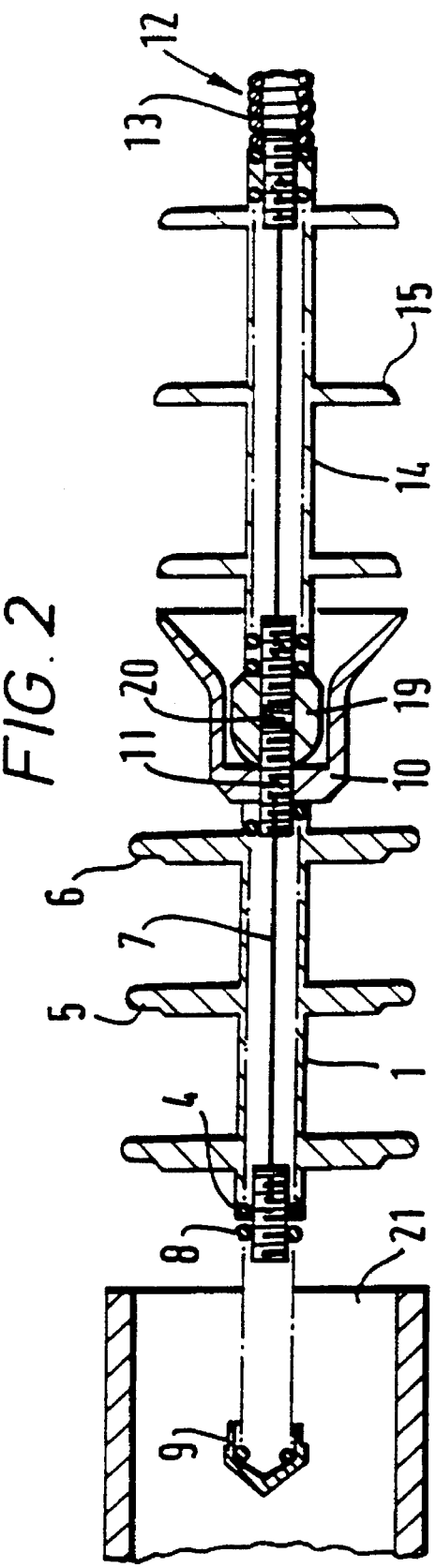

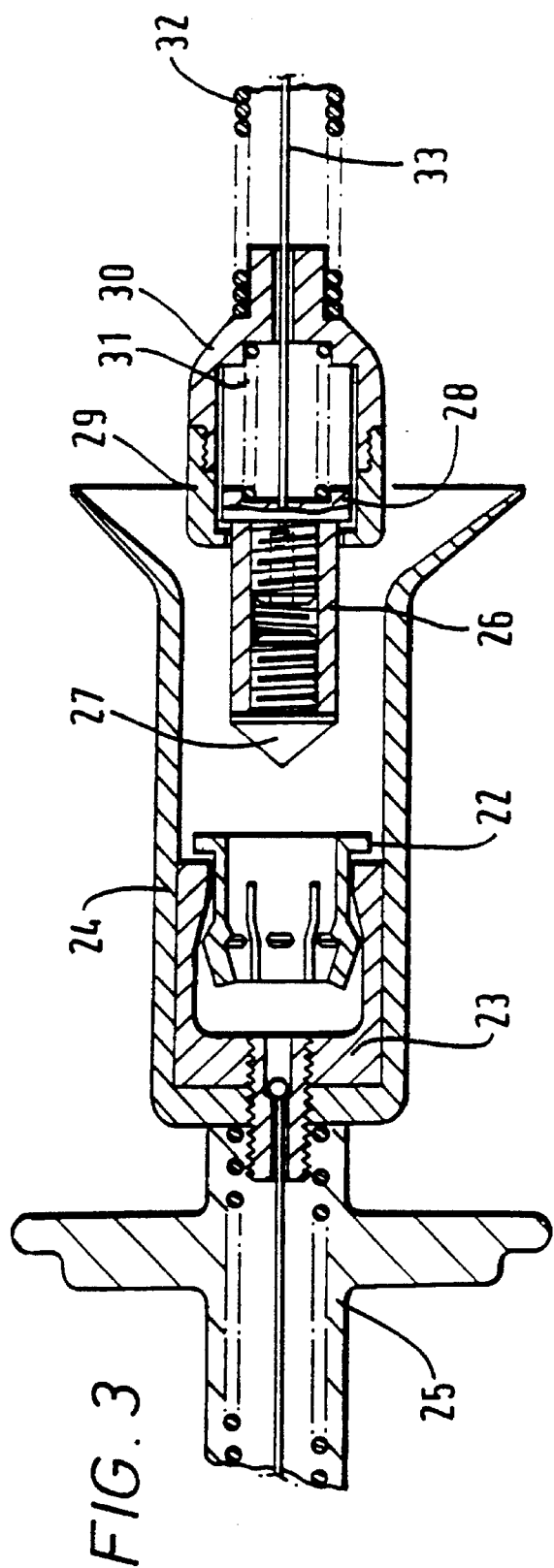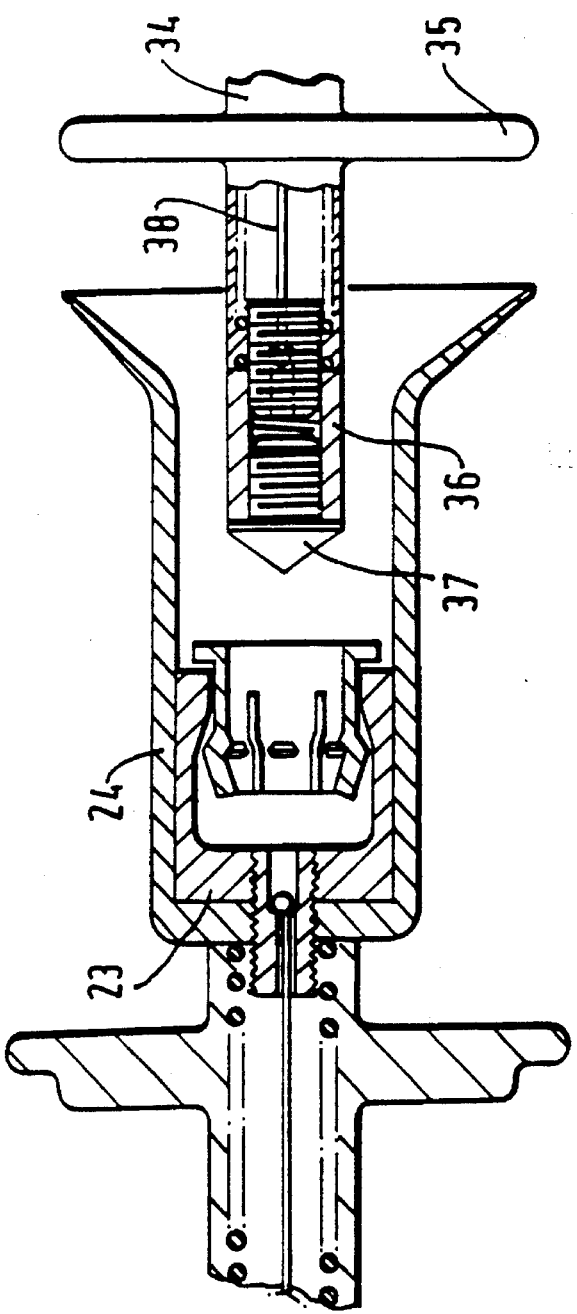
FIG. 3
FIG. 4

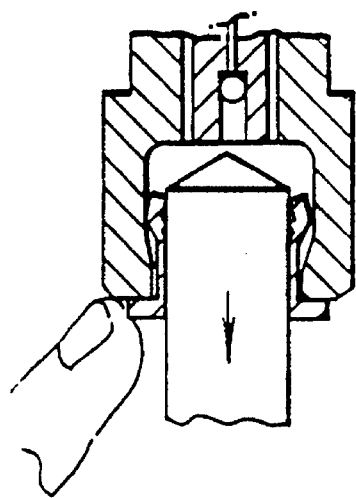
FIG. 6C
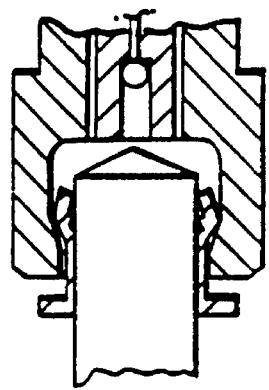
FIG. 6B
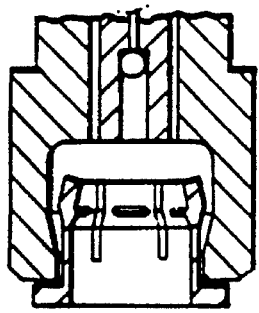
FIG. 6A
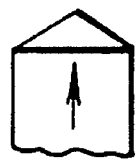
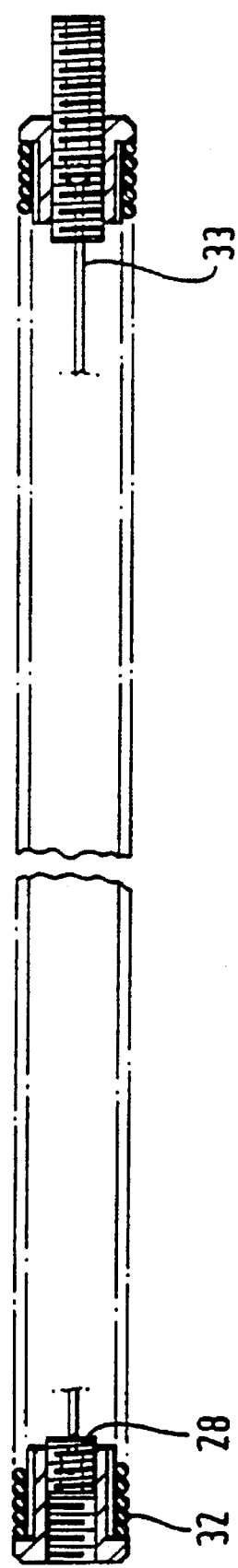
FIG. 6

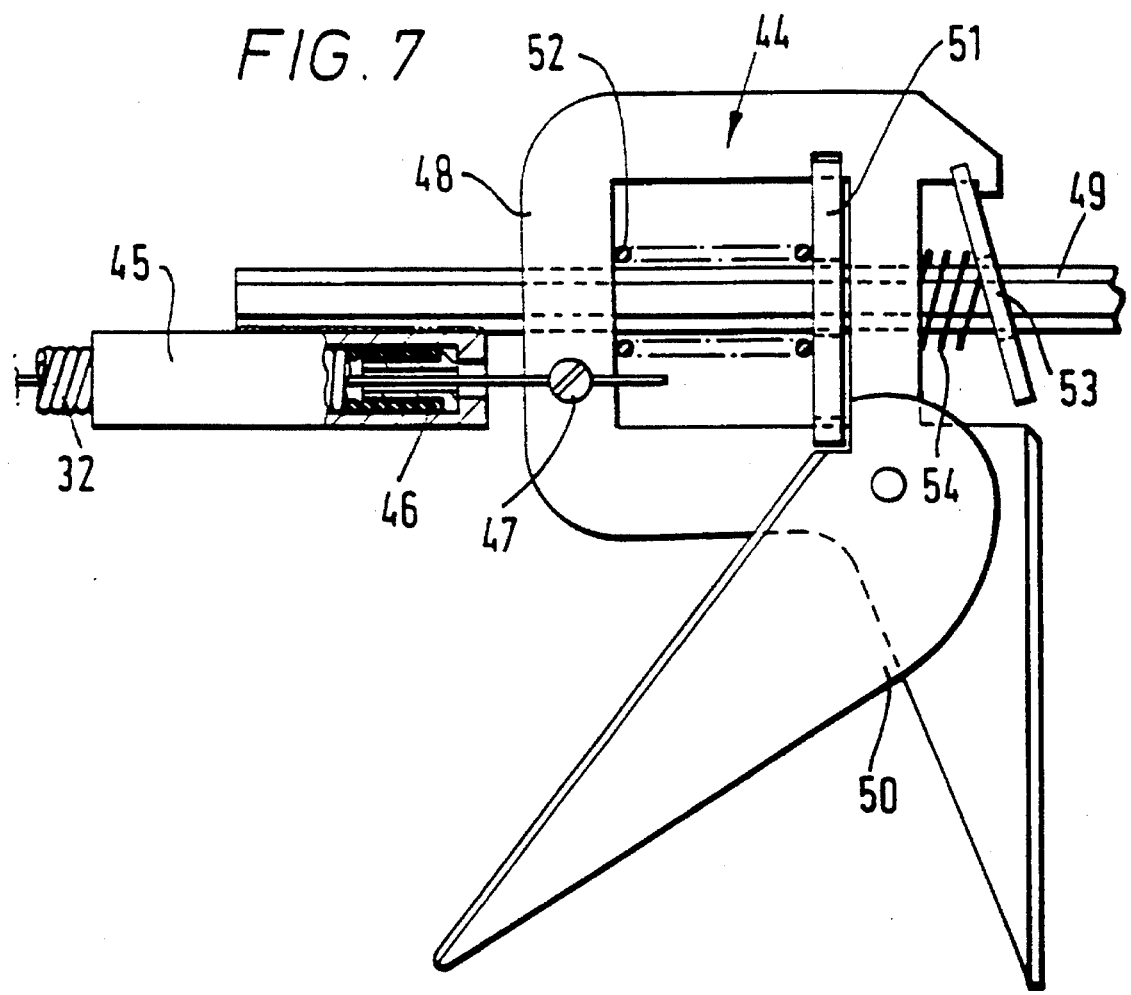
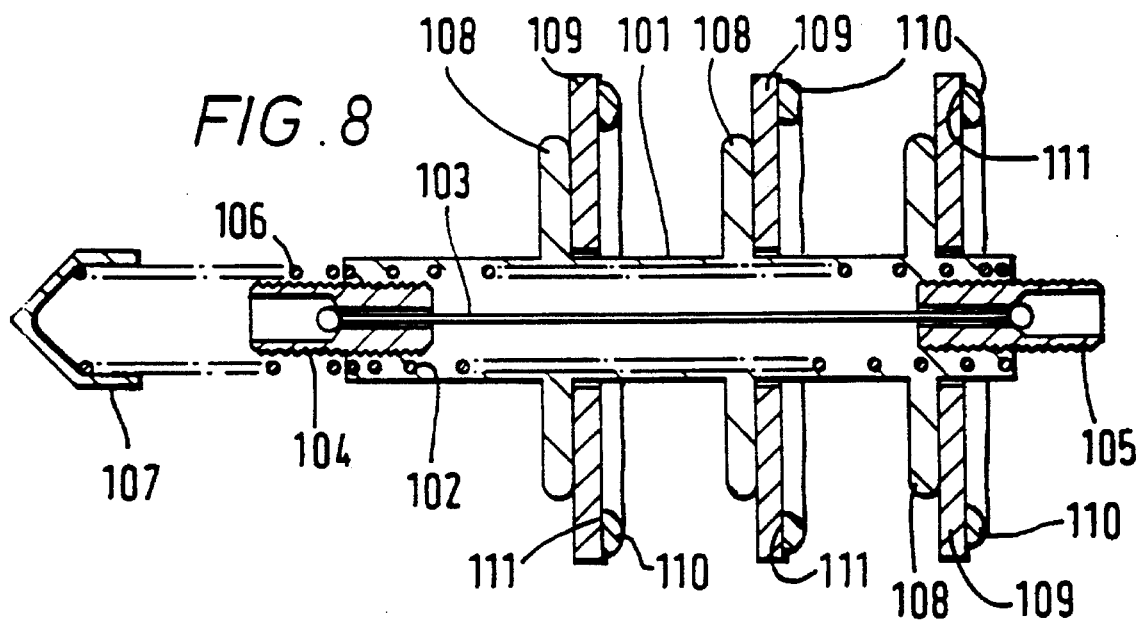

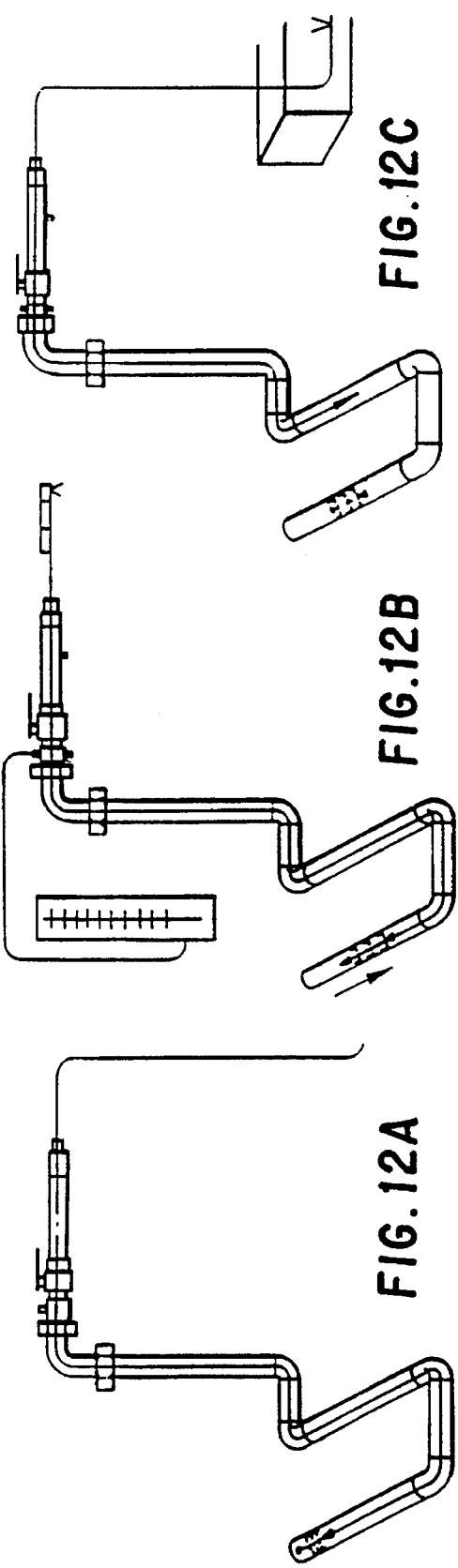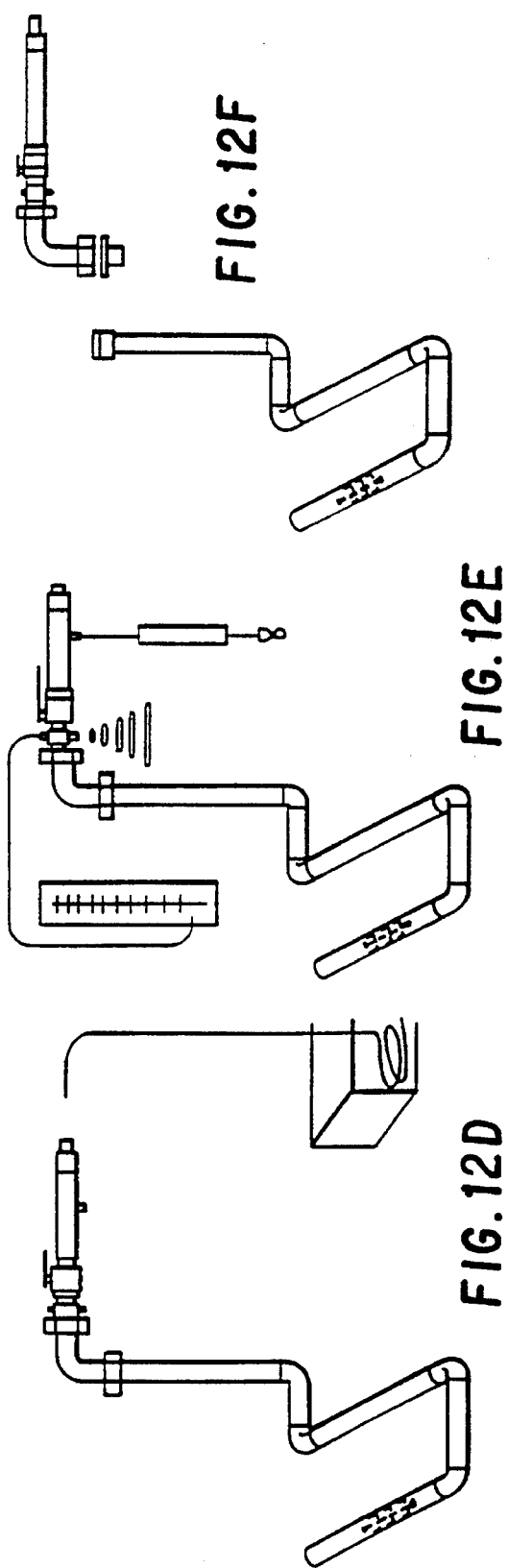

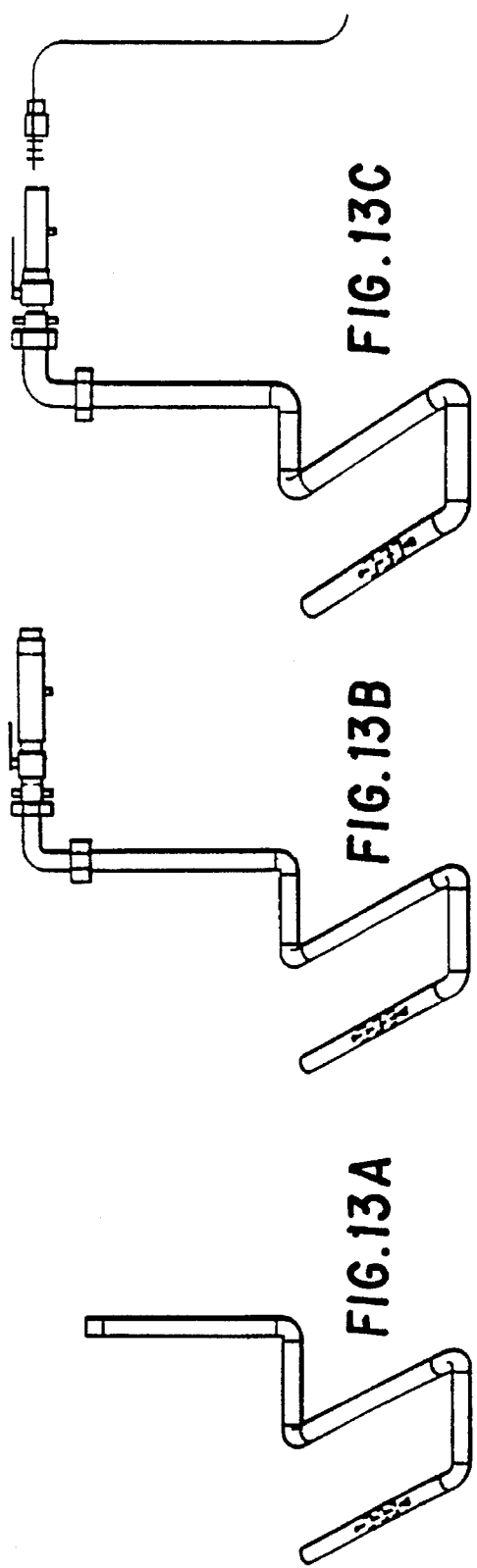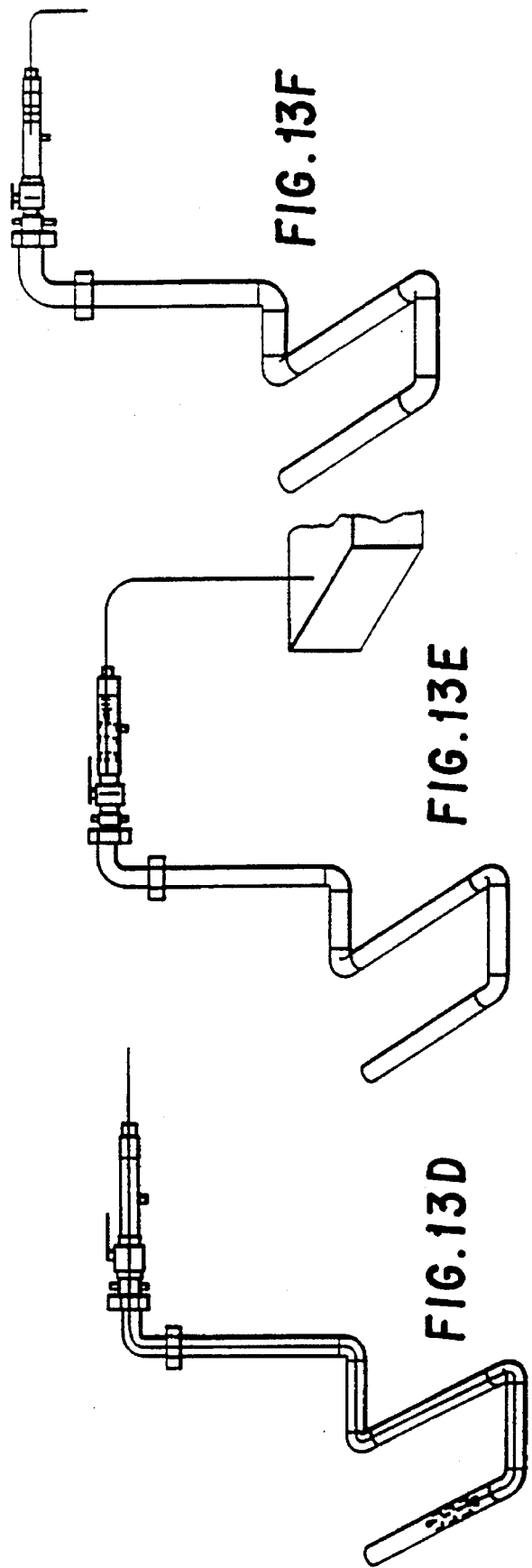

PIPE STOPPER HAVING A GUIDE MEMBER TO ASSIST IN GUIDING THE STOPPER AROUND A BEND IN A PIPE

BACKGROUND OF THE INVENTION

1. Field of the Invention

This invention relates to a pipe stopper, stopper kit and method, and more particularly to a pipe stopper, stopper kit and method adapted to effect a seal within a fluid-carrying pipe.

2. Description of Related Art

In the maintenance or renewal of domestic low pressure gas supply systems it is frequently necessary to cut off the gas supply temporarily at a distance remote from the access point, to allow such maintenance or renewal to be carried out. Typically such a requirement arises, for example, when exchanging or repairing a meter control cock, or an elbow, under "live" conditions, or when stopping off a gas supply at a point outside the consumer's premises. In some circumstances it is also necessary to cut off the gas supply from a premises for an extended period, for example, if the gas supply is to be withdrawn from a consumer for some reason.

It has previously been proposed to insert into the pipe a hollow tube having at one end an inflatable sack which is pushed down the pipe in a deflated condition and then inflated to block the pipe. However, with such a device it is still necessary for the inflation tube to remain in position, and this is often an inconvenience when carrying out repair work. There is therefore a continuing requirement for a system which will enable a pipe to be blocked at a distance remote from the access point without leaving any part or fitting in the pipe protruding from or interfering with the access point.

In addition to the above requirement, the point at which it is required to block the pipe is often beyond one or more pipe bends or elbows, and therefore desirably any blocking system should be able to negotiate at least one, and preferably two or more such bends or elbows.

In certain circumstances an improvement in the sealing capability of the known blocking system would also be desirable. For example, a public utility now requires that a seal for a domestic gas pipe should be able to withstand a pressure of up to 100 millibars for a minimum of 5 minutes with a maximum pressure loss of 1% over that time, and this is difficult to achieve with existing blocking methods.

SUMMARY OF THE INVENTION

In a first aspect the invention provides a pipe stopper which comprises an elongate resilient body member, sealing means arranged circumferentially of the body member and guide means to assist in guiding the stopper around a bend and/or an elbow in the pipe.

In accordance with this first aspect of the invention there is provided:

a pipe stopper adapted to be moved along a pipe to provide a block therein at a point remote from an access point, comprising an elongate resilient body member comprising a resilient and/or elastomeric material, circumferential sealing means spaced along the length of the body member, resilient reinforcing means for the body member, and guide means extending from the front or leading end of the pipe stopper to assist in guiding the pipe stopper around a bend and/or an elbow in the pipe.

In a second aspect the invention provides a stopper system which provides means for placing a stopper at a distance remote from an access point and means for retrieving the stopper at a later time if necessary.

In accordance with this aspect of the invention, there is provided a stopper kit adapted to block a pipe at a point remote from an access point thereof which comprises a stopper means adapted to be an interference fit within the pipe and to be moved along the pipe from an access point to a point remote therefrom, a placement means adapted to move the stopper means along the pipe from the access point to a point remote therefrom, a retrieval means adapted to move the stopper means from the remote point to the access point, the stopper means and the retrieval means being provided with cooperating engagement means so arranged that on engagement the stopper means can be moved by the retrieval means from the remote point to the access point, and sealing means comprising a circumferential flange and a sealing washer, characterised in that the sealing washer comprises a flexible circumferential edge region which provides a relatively low resistance to insertion of the stopper means in the pipe, but which, when the stopper means is pulled back a short distance, is deformed or folded into engagement with the flange and the internal wall of the pipe so as to form a seal.

In this embodiment of the invention, the pipe stopper comprises a body member provided with a circumferential flange, the flange being adapted to slide relatively easily within the internal bore of the pipe or conduit, and a sealing washer abutting or adjacent to the trailing face of the flange, the sealing washer being adapted to be an interference fit within the internal bore of the pipe or conduit and having a flexible circumferential edge region adapted to be deformed or folded when the stopper is inserted into the pipe or conduit and moved towards its operative position, the arrangement being such that the circumferential edge region of the sealing washer is deformed or folded away from the flange when the stopper is inserted into the pipe or conduit, and is deformed or folded into contact with the flange by frictional engagement with the internal wall of the pipe or conduit, so as to form a seal between the flange and the internal wall of the pipe or conduit, when the stopper is pulled back a short distance along the pipe or conduit.

In accordance with this aspect the invention also provides a method for blocking a pipe at a point remote from an access point thereof, which comprises moving a stopper means provided with sealing means comprising a circumferential flange and a sealing washer and adapted to be an interference fit within the pipe from an access point to a point remote therefrom using a placement means, disengaging the stopper means from the placement means, thereby leaving the stopper means in position in the pipe, and subsequently engaging the stopper means with a retrieval means and moving the stopper means from the remote point to the access point using the retrieval means, characterised in that the sealing washer comprises a flexible circumferential edge region which provides a relatively low resistance to insertion of the stopper means in the pipe, but which , when the stopper means is pulled back a short distance, is deformed or folded into engagement with the flange and the internal wall of the pipe so as to form a seal.

It can be seen that the invention provides a pipe stopper, a stopper kit and a method which can enable a pipe to be blocked temporarily at a remote point using only a single access point which may be, for example, an end of the pipe several metres away. Preferably the placement means is adapted to push the stopper means along the pipe from the access point to a point remote therefrom, and the retrieval means is adapted to pull the stopper means from the remote point to the access point.

Preferably the pipe stopper body member comprises a resilient and/or elastomeric material, and for example, it may comprise a natural or synthetic rubber, or a similar elastomeric polymeric material such as for example, a polyurethane, a polynorbornene, or an elastomeric olefin polymer or copolymer.

The circumferential sealing means may comprise a plurality of circumferential fins or flanges arranged along the length of the body member, which are preferably slightly deformed when the stopper is pushed into the pipe thereby providing an interference fit to block the passage of fluids along the pipe. One or more fins or flanges may be provided, with the optimum being around three. The fins or flanges may have a wedge-shaped or chamfered cross-section at their outer edges. The fins or flanges may be of the same or different diameters, with, in the latter case, the larger diameter fins or flanges at the rear.

In still another aspect, the invention provides a method for blocking or sealing an internal bore of a pipe or conduit in which there is used a stopper as aforesaid, the method comprising inserting the stopper into the pipe or conduit towards its operative position so as to deform or fold the circumferential edge region of the sealing washer away from the flange, and pulling the stopper back a short distance along the pipe or conduit so as to deform or fold the circumferential edge region of the sealing washer into contact with the flange by frictional engagement with the internal wall of the pipe or conduit, so as to form a seal between the flange and the internal wall of the pipe or conduit.

In this embodiment and method the flange or flanges are adapted to be a sliding fit within the internal bore of the pipe or conduit and most or all of the sealing is provided by the sealing washer, the circumferential edge region of which is folded or deformed into contact with the circumferential edge of the flange and the internal wall of the pipe or conduit, so as to be compressed therebetween, in a manner which will be described hereinafter.

Any number of flanges may be used, depending upon the sealing requirements, but the optimum number is usually around 3. Although each flange is adapted to slide relatively easily within the internal bore of the pipe or conduit, the invention also envisages the possibility that the flanges may be flexible or resilient and may themselves be slightly deformed when the stopper is inserted into the pipe thereby contributing to the sealing effect. Each flange is, however, preferably of a diameter slightly less than the internal diameter of the bore of the pipe or conduit. Each flange is preferably made from a material which is more rigid than the material of its cooperating sealing washer.

The sealing washer is preferably made from a flexible elastomeric material, which may be a soft solid compound, or a soft closed cell foam polymeric compound. Suitable materials include natural and synthetic rubbers, olefin polymers and copolymers, urethane polymers, silicone polymers, and other similar materials. The sealing washer is an interference fit within the internal bore of the pipe or conduit, and preferably the diameter of the sealing washer is from 5–25% greater than the diameter of the internal bore, preferably from 10–20%, and most preferably around 15% greater.

Preferably the flange and the sealing washer are about equal in thickness, but this is my no means essential, and the thickness of the sealing washer will to some extent be determined by the ability of its circumferential edge region to be folded over and compressed between the flange and the internal wall of the pipe or conduit. Preferably the sealing washer is bonded to the flange by vulcanising, or by the use of an adhesive. The diameter of the sealing washer is preferably from 5–50% greater than the diameter of the flange, preferably from 10–30%, and most preferably about 20% greater than the diameter of the flange.

In a particularly preferred embodiment of the invention, the trailing face of the sealing washer is provided with a sealing compound on at least the flexible circumferential edge region thereof. In this arrangement, the sealing compound is protected from contact with the internal wall of the pipe or conduit by the deformation or folding of the edge region of the sealing washer as the stopper is pushed into the pipe or conduit but is brought into contact with the internal wall as the stopper is pulled back a short distance along the pipe or conduit. The sealing compound may for example be an RTV silicone compound, or some other similar sealing material. The use of a sealing compound is particularly advantageous when it is desired to make a permanent block in the pipe or conduits.

The resilient reinforcing means for the body member can, for example, comprise a harder resilient or elastomeric material which is positioned inside the body member. Such a reinforced body member may be produced, for example, by injection or compression molding. Preferably, however, the reinforcing means comprises a resilient coil spring, usually of metal, and in a particularly preferred construction, the body member is moulded around the spring, so that the spring is embedded in the wall of the body member.

It is, as previously mentioned, particularly desirable for the stopper to be able to negotiate bends or elbows in the pipe, and, in accordance with the invention, the stopper is provided with a guide means extending from the front or leading end of the stopper which assists in guiding the stopper around bends and elbows. The guide means can, for example, comprise a flexible spring which preferably is provided with a relatively hard end cap which may be made from a hard elastomeric material.

In another preferred embodiment, the guide means can comprise a guide disc, having a diameter slightly smaller than that of the pipe, and mounted on the front or leading end of the pipe stopper. The disc, which is preferably spaced apart from the leading fin or flange of the sealing means, may be secured to the front or leading end of the body member, and preferably has a generally conical shape, with an inclusive cone angle of from 90° to 170°. In negotiating a bend or elbow, the disc acts as a guide, which functions to keep the centre line of the pipe stopper close to the centre line of the pipe and bend or elbow, thereby reducing the tendency of the pipe stopper to dig in to the wall of the pipe, bend or elbow The body member is preferably provided with a central strain member, which can, for example, be a wire extending along the longitudinal axis of the body member. The strain member provides longitudinal rigidity to the body member whilst allowing lateral flexibility. Preferably the strain member is anchored by connectors, which are situated at the front and rear of the body member.

The placement means preferably comprises a rod or tube which may be rigid or flexible but which preferably has sufficient flexibility to pass around bends and elbows in the pipe. In a particularly preferred embodiment, the placement means comprises an elongate coil spring having substantial lateral flexibility, but which has sufficient longitudinal strength to bush the stopper means along the pipe. Preferably the coil spring placement means is provided with a strain wire to increase its tensile strength whilst allowing continued flexibility. The strain wire preferably extends along the inside of the coil spring placement means. The placement means can be of any desired length, depending on the distance from the access point at which it is required to block the pipe. Very satisfactory results have been obtained using a placement means of up to 12 metres in length and this is believed to be by no means the limit of the system. In order to minimise any possible risk of kinking of the coil spring placement means when a compressive force is applied thereto, a sheath is preferably applied over the coil spring. This sheath can, for example, comprise a further coil spring wound with a helix of opposite turn to that of the coil spring placement means. The arrangement is preferably such that the compressive force is applied preferentially or solely to the (inner) coil spring placement means.

The retrieval means can also be a rigid or flexible rod or tube, but preferably comprises a coil spring similar in structure and length to the placement means. In certain embodiments of the invention, the placement means and the retrieval means may comprise the same part, as will be hereinafter explained.

Any suitable connect/disconnect system may be used for the co-operating engagement means. At its simplest the engagement means may comprise a screw thread assembly in which a male threaded portion fits into a female threaded socket. To connect or disconnect the assembly, this requires that the retrieval means is rotated within the pipe. In another embodiment, the co-operating engagement means may comprise a collet which is preferably positioned at the rear or trailing end of the pipe stopper, and is arranged so as to co-operate with a docking sleeve at the leading or forward end of the retrieval means. Suitable spring collet systems are supplied for example by John Guest Limited and Legris Limited.

In order to assist the positioning of the co-operating engagement means, a docking cone is preferably provided at the rear or trailing end of the stopper means. It will be appreciated that the collet, docking sleeve and docking cone may be interchangeably arranged on either the stopper means or the retrieval means. Further positioning assistance for the co-operating engagement means is preferably obtained by providing the retrieval means with a pilot guide assembly adjacent to its leading or forward end.

Preferably the placement means is also provided with all or part of an engagement means adapted to co-operate with the stopper means so that the engagement means can be connected and disconnected from the stopper means. Thus the placement means may be provided with a screw threaded section attachable to the stopper means or may have a docking sleeve co-operating with a collet on the stopper means.

As previously mentioned, where a collet is used at the rear of the stopper means, the strain wire in the placement means may be used to retract the docking sleeve from the collet thereby enabling the placement means to be detached from the stopper means.

The invention can be applied to many circumstances in which it is required to stop or limit the flow of a fluid, and particularly a gas, along a pipe or conduit and all such uses included within the scope of the claims appended hereto are to be considered as falling within the invention.

BRIEF DESCRIPTION OF DRAWINGS

Embodiments of the pipe stopper, stopper kit and method of the invention will now be described with reference to and as illustrated in the accompanying Drawings in which:

FIG. 2 shows the embodiment of FIG. 1 in sectional side elevation with the pipe stopper connected to the retrieval means;

FIG. 3 shows a second embodiment of a stopper kit according to the invention in sectional side elevation with the pipe stopper and the placement means disassembled;

FIG. 4 shows the embodiment of FIG. 3 in part sectional side elevation with the pipe stopper and the retrieval means disassembled;

FIG. 5 shows the sequence of assembly and disassembly of the embodiment of FIGS. 3 and 4;

FIG. 6 shows the retrieval means of FIG. 4 in sectional side elevation;

FIG. 7 shows a side elevation of a strain wire adjuster for use in the embodiment of FIG. 3.

FIG. 8 shows a second pipe stopper according to the invention;

FIGS. 11, 12, 13 and 14 show the sequence of operations involved in placing a stopper according to the invention and in changing a meter control cock under "live" conditions;

DETAILED DESCRIPTION OF PREFERRED EMBODIMENTS

Figure 1A:
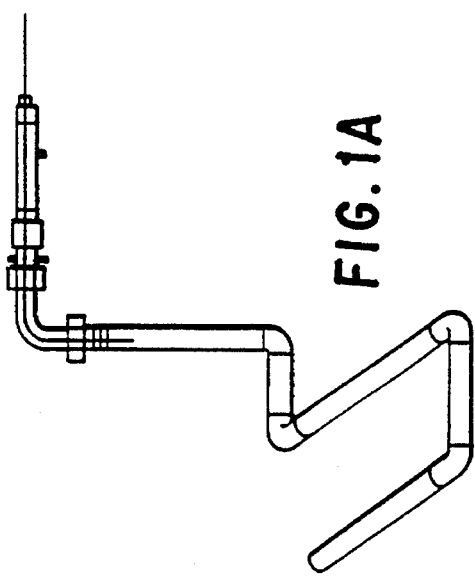
FIG. 1 snows a first embodiment of a stopper kit according to the invention in sectional side elevation with the pipe stopper and the retrieval means disassembled.
Figure 14D:
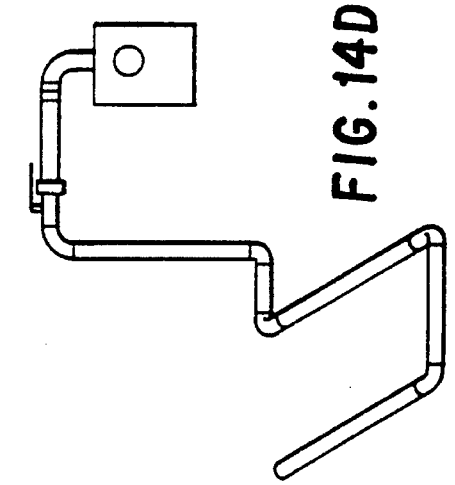

Referring now to FIG. 1, the assembly comprises a stopper and docking cone assembly 1 and a placement and retrieval assembly 2. The stopper, which may comprise a flexible or rigid material, has a body portion 3, which preferably comprises an elastomeric material moulded around a spring 4, and which is provided with three fins 5 having flexible profiled circumferential edge regions 6. The use of softer rubbers such as polynorbornene permits the use of thicker fins. A central strain wire 7 provides longitudinal rigidity to the structure whilst allowing lateral flexibility. Connected to the forward end of the stopper assembly is a guide spring 8 which extends in front of the stopper assembly and is provided with a rigid or elastomeric guide cap 9. To the rear of the stopper assembly is attached a docking cone 10 which is bonded around an externally threaded hollow rod 11.

The placement and retrieval assembly comprises a rod 12, which may be rigid or flexible, but which as shown comprises a laterally-flexible spring 13. At the forward end of the placement and retrieval assembly there is provided a docking guide assembly 14 which has three centering fins 15 spaced along its length. The body 18 of the docking guide assembly may be rigid or flexible, but as shown comprises an elastomeric material moulded around a spring 17. The docking guide assembly is provided with a strain wire 18 in a similar fashion to the stopper assembly. At the front end of the docking guide assembly there is provided a docking piece 19, comprising an elastomeric material moulded around an internally threaded tube 20. The internal thread on the tube 20 co-operates with the external thread on the tube 11.

In operation the stopper and docking cone assembly is screw-threadedly engaged with the placement and retrieval assembly as shown in FIG. 2, and then inserted into the pipe 21. The circumferential edges 6 are deformed as the stopper is inserted into the pipe, thereby making a good seal against the pipe walls. Where the entire assembly is flexible, it is able to negotiate bends and elbows in the pipe assisted by the guide spring 8. When the stopper assembly has reached its desired location, as determined by the length of extension rod still protruding from the pipe, the protruding end of the rod 12 is rotated so as to release the docking piece from the docking cone so that the placement and retrieval assembly can be removed from the pipe.

When it is desired to retrieve the stopper the placement and retrieval assembly is merely inserted into the pipe until the docking piece 19 mates with the docking cone 10. This process is assisted by the tapering sides of the cone 10 which extend almost to the wall of the pipe 21 and by the docking guide assembly 14. To make the connection the protruding end of the rod 12 is rotated so that the threaded tube 11 becomes connected to the internally threaded tube 20. The stopper assembly can now be pulled from the pipe by pulling on the placement and retrieval assembly, and re-used as required. This design of stopper has the advantage that it is able to pass through a meter control valve as will be described later.

Referring to FIG. 3, there is shown an assembly which is similar in many respects to that of FIGS. 1 and 2 except that docking of the placement assembly with the stopper assembly is by means of a spring collet 22 enclosed within a collet sleeve assembly 23. The spring collet and collet sleeve assembly are positioned within the flexible docking cone 24 and are screwed to the stopper assembly 25. The placement assembly has at its front end a docking sleeve 26 which has a wear tip 27 and which is mounted on a strain wire retainer 28. The strain wire retainer 28 is slidable within a housing having a front portion 29 and a rear portion 30 and is acted upon by a compression spring 31 which urges it in the direction of the collet 22. The main body portion of the placement assembly comprises an elongate close coiled spring 32 having a strain wire 33 centrally disposed therein.

Referring to FIG. 4, the retrieval assembly is similar to the placement assembly except that at its front end it has a pilot guide assembly 34 having three guide fins 35 spaced along its length. In front of the guide assembly is a fixed docking sleeve 36 having a wear tip 37. Extra longitudinal rigidity is imparted to the pilot guide assembly by a centrally disposed strain wire 38 which is mounted at its front end in the docking sleeve 36.

Referring now to FIG. 5, the sequence of docking and releasing the collet mechanism is shown in FIGS. A–C. FIG. A shows the collet ready to receive the docking sleeve for insertion. In FIG. B the docking sleeve has been inserted and is secured in position by the combined action of the collet and the collet sleeve assembly. FIG. C shows that by pushing on the shoulder of the collet, and simultaneously extracting the docking sleeve, the connection can be released.

FIG. 6 shows the main body of the retrieval mechanism, which as can be seen comprises an elongate close coiled spring 32 and an internal strain wire 33. the strain wire 33 is fixed at its front end to the strain wire retainer 28 and at its rear end to a strain wire adjuster mechanism as shown in FIG. 7. The strain wire release mechanism 44 comprises a sleeve 45, fitted with the coil spring 22 (from FIG. 3) and enclosing a brass bush 46, through which the strain wire passes. The strain wire is retained by a screw 47, positioned on the frame 48.

The frame 48, is slidable along a rod 49, which is welded to the sleeve 45, at one end. The frame 48 is provided with a cam handle 50 which acts against a thrust plate 51, through which the rod 49, also passes. The thrust plate acts upon the rod by a jamming action, to transmit a sliding motion to the rod and moves the frame to the right. This has the effect of increasing the tension of the strain wire which eventually overcomes the compression spring 31 (FIG. 3) enabling the docking sleeve 26 to retract and disengage from the stopper collet 22.

The movement of the cam handle 50, acting upon the thrust plate 51 also compresses spring 52, which returns the thrust plate 51 to its original position when the cam handle 50 is released. The rod 49 is held in position by a second thrust plate 53 and spring 54 located at the rear end of the frame 48 by a jamming action of the thrust plate upon the rod 49, and which will only allow movement of the frame to the right until such time as the tension of the strain wire is to be relaxed. This is carried out by pressing against the lower end of the rear thrust plate to compress the spring and release the jamming action, allowing the rod 39 to move freely and relaxing the strain wire.

In operation the stopper mechanism, connected to the placement mechanism, is inserted into the pipe and pushed to the required location. Further pressure on the placement mechanism causes the edge of the front housing 29 to press against the collet shoulder, moving the collet 22 in a forward direction. The docking sleeve can now be extracted from the collet by increasing the tension of the strain wire 33 through operation of the cam handle 40. The placement mechanism can now be removed from the pipe, leaving the stopper mechanism in position.

When it is desired to remove the stopper from the pipe, the retrieval mechanism shown in FIG. 4 is inserted into the pipe until it enters the docking sleeve, centred by the pilot guide assembly, and mates with the spring collet 22. The stopper mechanism can now be extracted from the pipe by pulling on the retrieval mechanism.

Referring to FIG. 8, the stopper comprises an elastomeric body portion 101 moulded around and bonded to an internal spring 102. The body portion has a strain wire 103 which joins connector tubes 104 and 105, which may be made from any suitable rigid material, for example metal or rigid plastics such as nylon, and are positioned respectively at the front and rear ends of the body 101. A guide spring 106 having a nose cap 107 is provided at the front of the stopper to enable the stopper more easily to traverse bends in the pipe. The body portion is provided with flanges 108 having fixed thereto sealing washers 109. The sealing washers may be loose on the body, but are preferably fixed to the trailing faces of their respective flanges by vulcanisation or by the use of a suitable adhesive. The diameter of each sealing washer is around 20% greater than the diameter of its associated flange. Sealing material 110, comprising an RTV silicone compound, is applied to the circumferential edge region 111 of the trailing face of each of the sealing washers 109.

Figure 9:
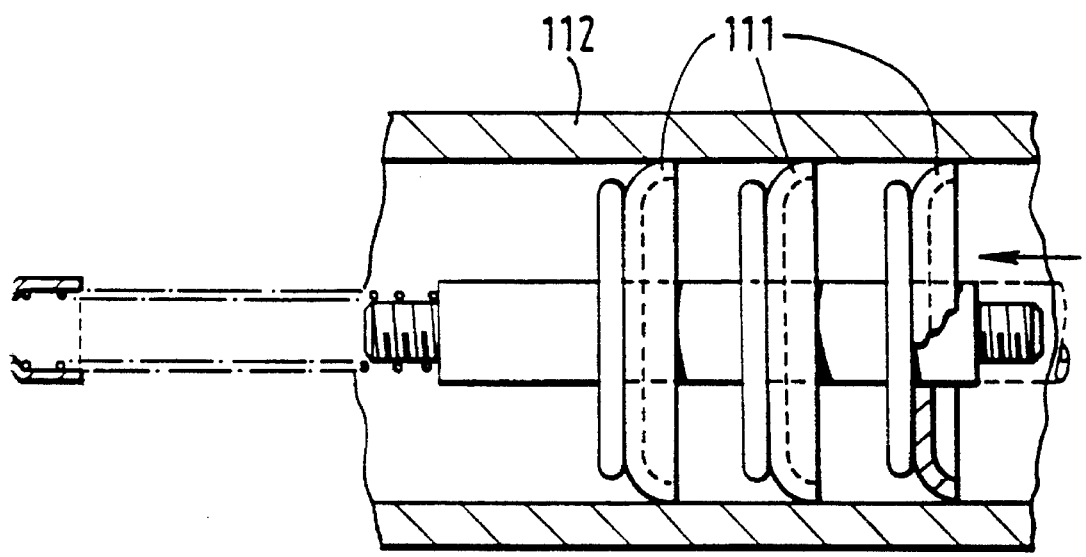
FIG. 9 shows the stopper of FIG. 8 inserted into a pipe, the act of moving the pipe stopper along the pipe folding the washers away from their associated flanges.

Referring to FIG. 9, the stopper is inserted into a pipe 112 and is shown being pushed in the forward direction. It can be seen that the circumferential edge regions 111 are folded into a trailing position as the stopper is pushed along the pipe, such that they offer a relatively low resistance to the motion of the stopper.

Figure 10:
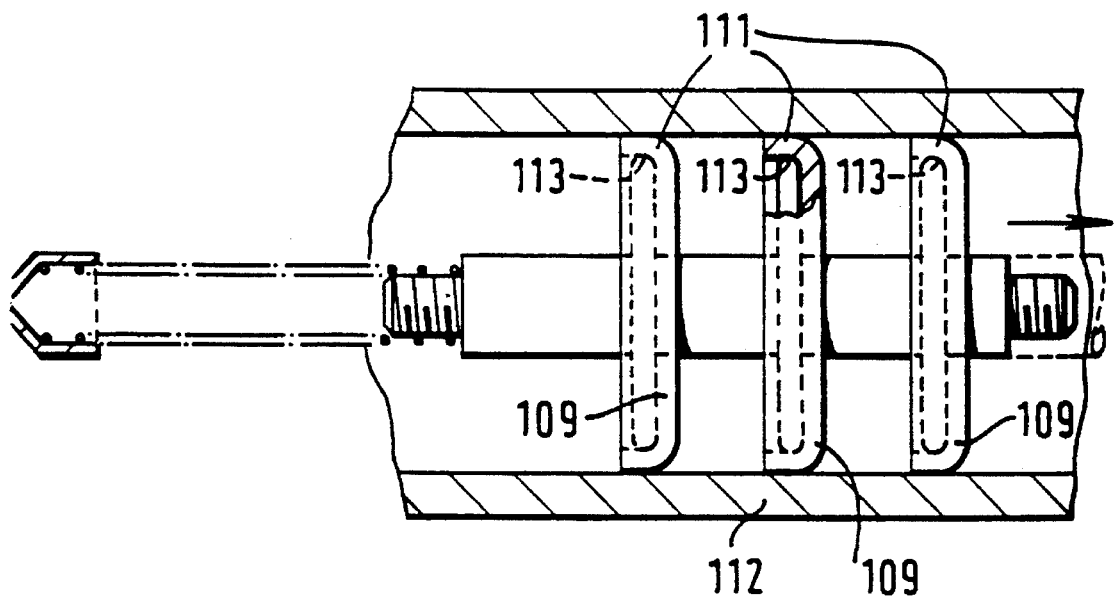
FIG. 10 shows the stopper of FIG. 8 with the washers in their sealing position, after the stopper has been pulled back a short distance along the pipe.
Figure 11C:
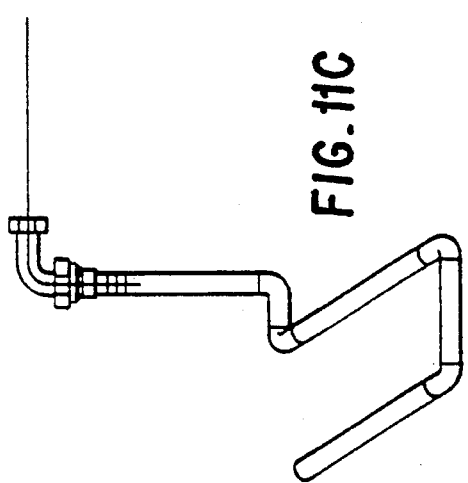
Figure 11F:
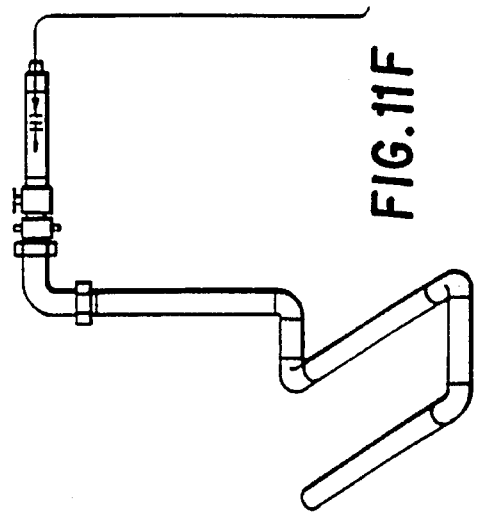
Figure 11B:
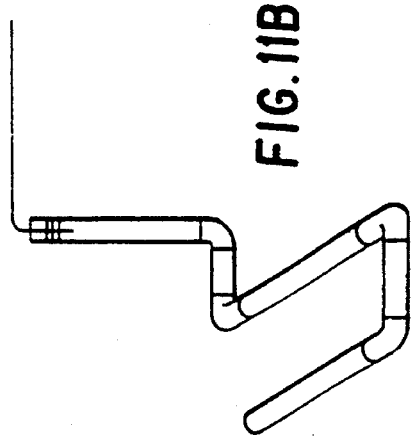
Figure 11E:
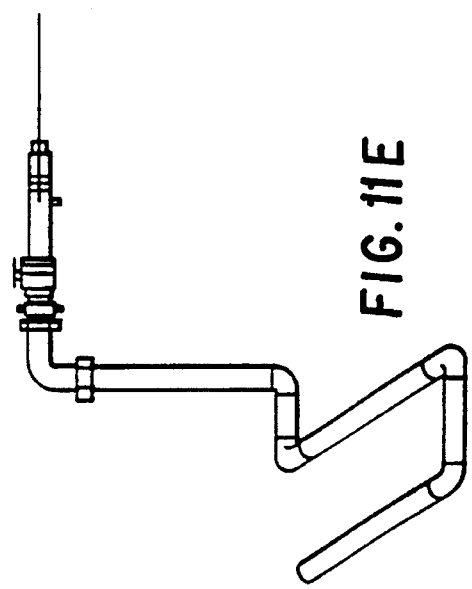
Figure 11A:
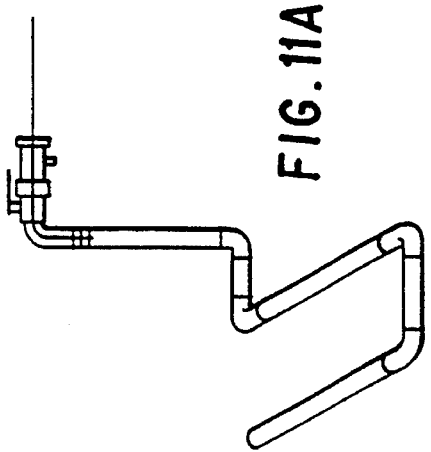
Figure 11D:
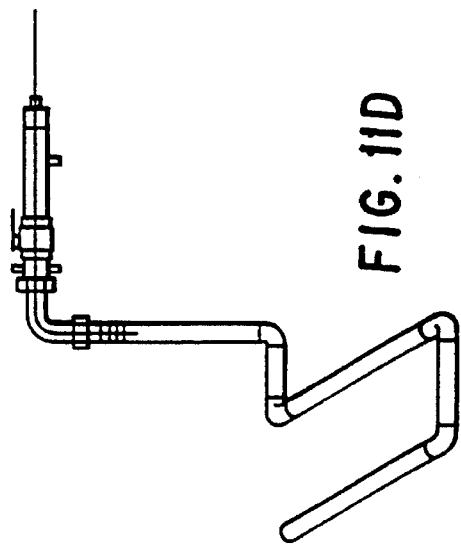

FIG. 10 shows the stopper in its sealing position, with the sealing washers 109 folded back at their edge regions 111 over the peripheries 113 of their associated flanges.

In operation, the stopper is pushed along the pipe using a placement means which may comprise a rigid or flexible rod or tube which can be connected to the connector 105 on the body of the stopper. As the stopper travels within the pipe, the sealing washers adopt a trailing attitude in which the outer edges of the washers trail behind the flanges as shown in FIG. 9, creating a relatively low resistance to the forward progress of the stopper and shielding the sealing compound (if used) from the internal walls of the pipe.

When the stopper has reached its desired position, as determined by the length of placement rod or tube which has been inserted into the pipe, the placement means is pulled back for a short distance, which can be, for example, from 5–25 cms, preferably from 10–20 cms, most preferably around 15 cms, to reverse the attitude of the sealing washers so that they fold back over the flanges creating an interference fit between the flange and the internal wall of the pipe, thus creating a seal within the pipe.

If a permanent seal is required, the sealing compound 110 is applied to the trailing face of the sealing washers, which, when the washers are folded back over the flanges, presents itself to the pipe wall, thereby creating a more permanent seal by filling the contours of the pipe and, in the case of an RTV silicone compound, forming a bond between the washer and the pipe wall.

FIGS. 11 to 14 show the sequence of operations for changing a meter control cock and placing a flow stopper in position within the service pipe under "live" conditions using a stopper according to the invention. The meter is first disconnected and a meter control cock changer (sold by Synthotech Marine Limited under the number SM2609) is fitted to the meter control cock (FIG. 11a). The exchanger kit comprises a body and a one meter long spring pusher rod with a temporary stopper. The stopper is inserted into the body and passed through the meter control cock, thus enabling the elbow, meter control cock and body to be removed whilst leaving the temporary stopper in position (FIG. 11b). A union coupling is then fitted to the stand pipe and a slow bend connected to the coupling (FIG. 11c). An adaptor head, illustrated in FIG. 15 and sold by Synthotech Marine Limited under the number SM2752, is then fitted to the slow bend (FIG. 11d). As will be seen from FIG. 15, the adaptor head comprises a launcher body 201 which is provided with a ball valve 202, a one way valve 203 connected to a first test piece 204, a second test piece 205, a star seal 206, and nuts 207, 208 to connect the launcher body at one end to the slow bend and at the other to a pair of polyethylene extension tubes 209, 210 which fit telescopically, one within the other.

The temporary stopper of the meter control exchanger is pulled back into the adaptor head and the ball valve 202 closed (FIG. 11e) A second stopper as shown in FIG. 8 having a placement rod means attached thereto is then inserted into the launcher body 201 (FIG. 11f) and pushed along the pipe until it reaches the required distance from the entry point (FIG. 12g). The second stopper should be at least one meter past the last elbow in the pipe. The telescopic plastic tubes 209, 210 aid in feeding the pusher rod through the pipe by helping to keep the flexible pusher rod straight. When not in use, the telescopic plastic tubes can be pushed one within the other. The placement rod is then pulled back to reverse the seals of the stopper and a pressure gauge connected to the first test piece 204 to check that the gas seal is effective (FIG. 12h). Operation of the trigger on the placement rod then releases the placement rod from the stopper (FIG. 12i). The placement rod is then pulled back through the pipe leaving the stopper in position (FIG. 12j). The system is then pumped to the required test pressure through the second test piece, the ball valve closed and excess pressure bled off (FIG. 12k). Finally the adaptor head equipment is removed and the pipe capped off (FIG. 12l).

Figure 14C:
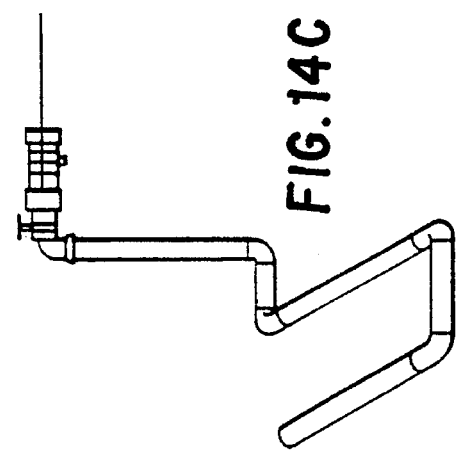
Figure 14F:
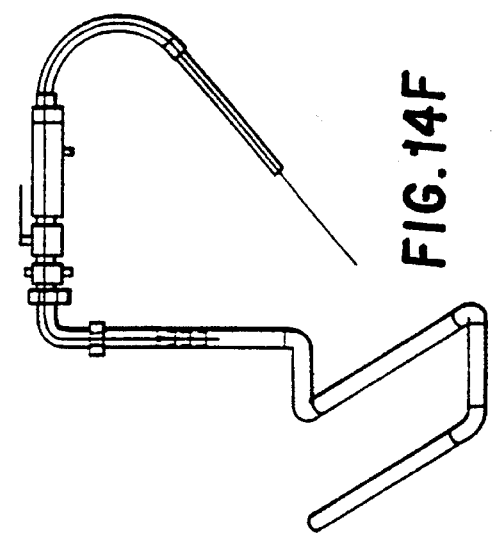
Figure 14B:
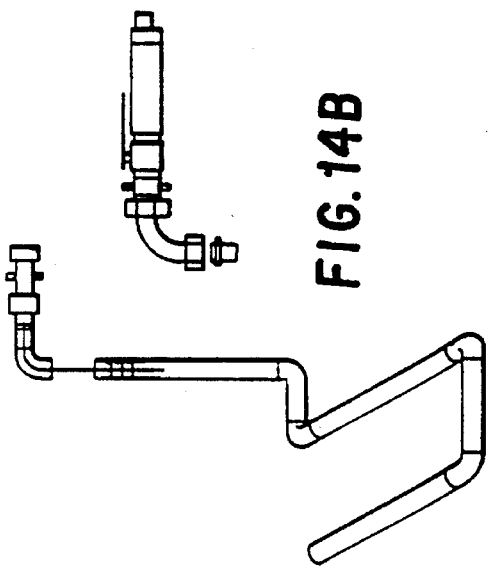
Figure 14E:
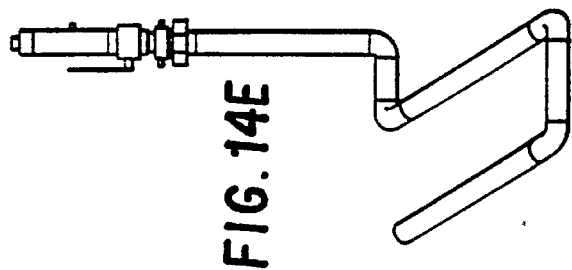
Figure 15:
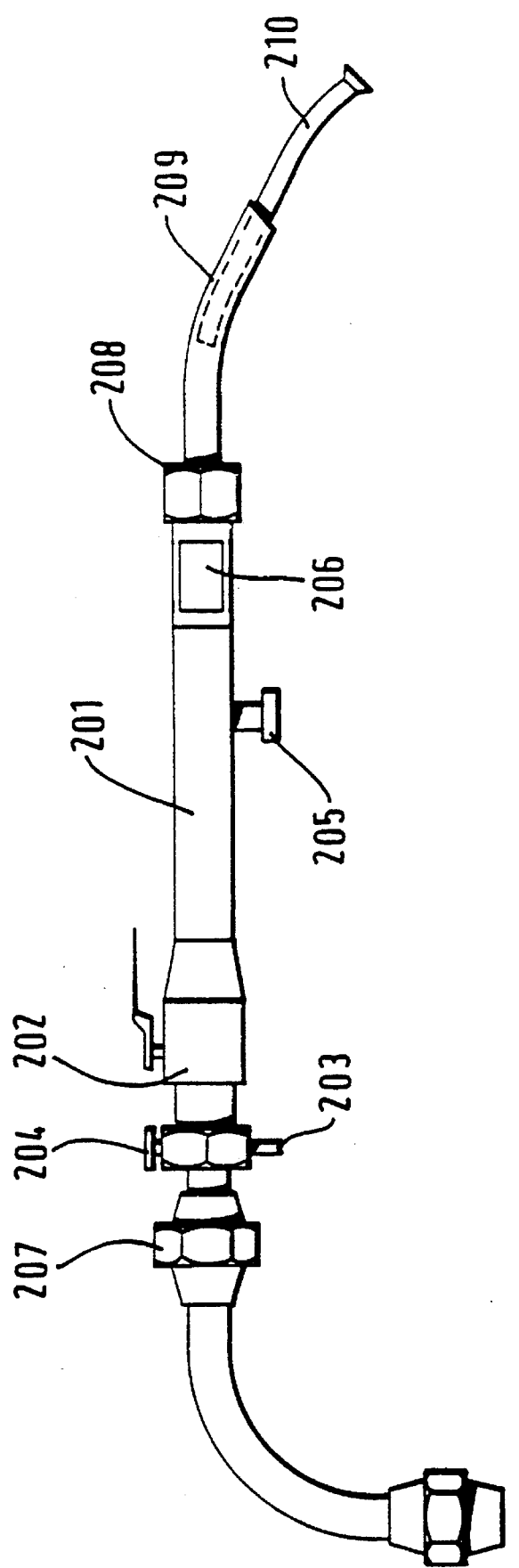
FIG. 15 shows in detail an adaptor head kit for use in the sequence of operations of FIGS. 11, 12, 13 and 14.

To replace the meter control cock and the meter and remove the stopper (FIG. 13m) the sequence of operation is reversed. First the adaptor head equipment SM2752 is connected (FIG. 13n), and a retrieval rod SM2767/2 (FIG. 6) carrying a pilot guide assembly as shown in FIG. 4 is pushed through the star seal 206 into the launcher body 201 (FIG. 13o). The ball valve 202 is then opened and the retrieval rod together with the pilot guide is pushed along the pipe until it connects with the stopper (FIG. 13p). The retrieval rod is then pulled back so that the stopper and pilot guide assembly are drawn into the adaptor body (FIG. 13q). The ball valve is then closed and the retrieval rod, stopper and pilot guide assembly removed. For reconnecting the gas supply, a pusher rod and temporary stopper from Synthotech Marine kit number SM2609 is inserted into the launcher body (FIG. 13r), the ball valve opened and the temporary stopper pushed into the stand pipe (FIG. 14s). The adaptor head is removed and a new meter control cock and elbow fitted (FIG. 14t). The temporary stopper is pulled back into the meter control exchanger and the meter control cock closed (FIG. 14u). Finally, the meter control exchanger body is removed and the meter reconnected (FIG. 14v). FIGS. 14w and 14x show respectively an alternative method of fitting the adaptor head to the stand-pipe, and the use of a long sleeve to aid in pushing the push rod.

Figure 16:
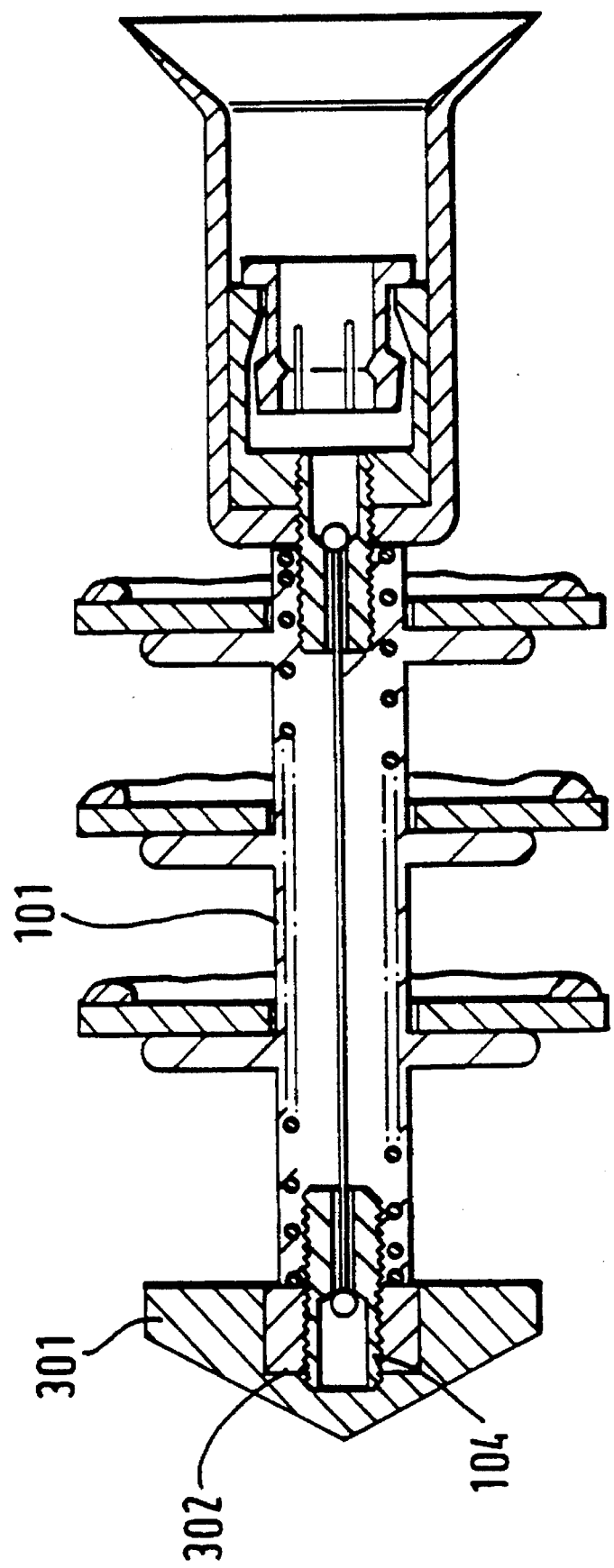
FIG. 16 shows a third pipe stopper according to the invention.

Referring to FIG. 16, there is shown a pipe stopper similar to that shown in FIG. 8, and the same parts have the same designated numbers. On the front of the body portion 101 is mounted a moulded rubber disc guide 301 bonded to a steel insert 302. The guide disc 301 is secured to the connector 104. The guide disc has a diameter slightly smaller than that of the pipe, and has a cone angle of 130°. The presence of the guide disc can enable the pipe stopper to negotiate the severest of elbows in the pipe without becoming stuck.

Figure 17:
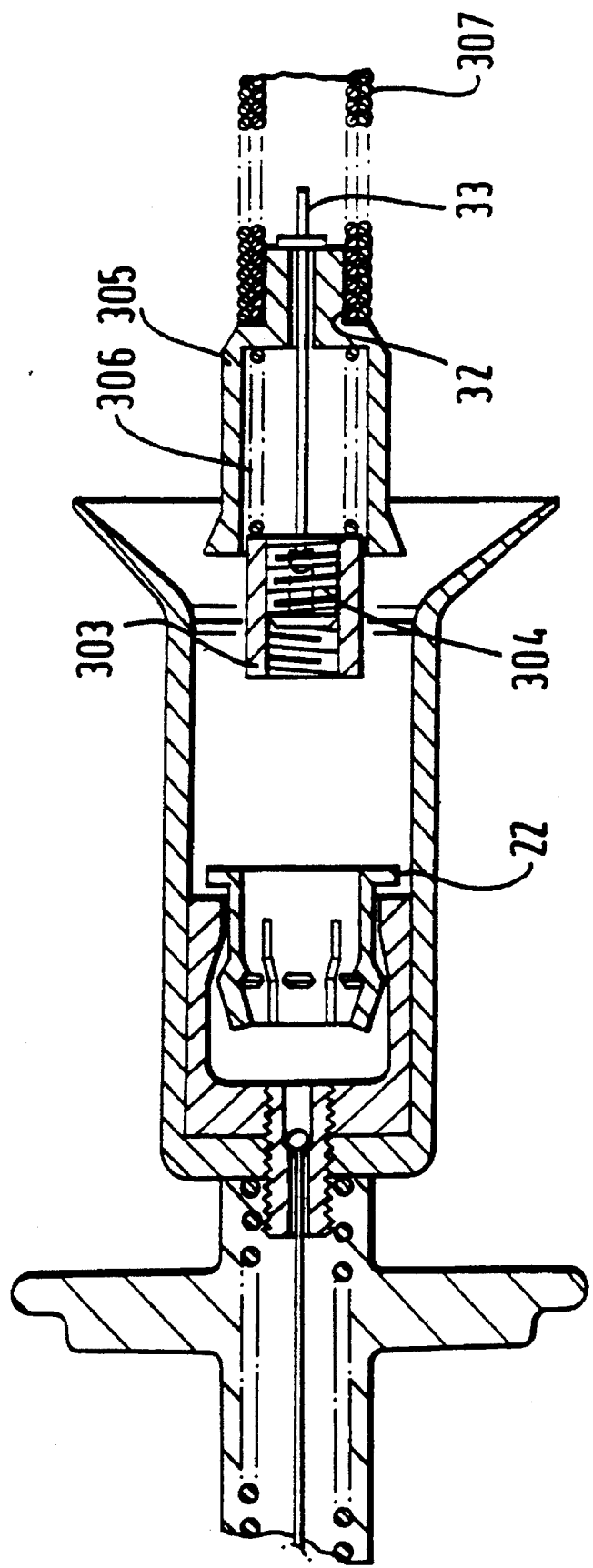
FIG. 17 shows a modification of the embodiment of FIG. 3 illustrating the use of a helical spring outer sheath for the coiled spring placement means and a modified release end connector.

Referring to FIG. 17, there is illustrated a stopper kit similar to that shown in FIG. 3, and the same parts again have the same designated numbers. The placement assembly comprises a docking sleeve 303 mounted on a strain wire retainer 304. The docking sleeve is slidable within a housing 305 and is acted upon by a compression spring 306 which urges it in the direction of the collet 22. The wire stop, mounted on the strain wire prevents the docking sleeve 303, and the strain wire retainer 304, from being ejected from the rear housing 305, by the compression spring 306. The body portion of the placement assembly comprises an elongate close coiled spring 32 having a strain wire 33 disposed therein, and an outer coil sheath 307 which comprises a helical coiled spring helically-wound with an opposite turn to that of the spring 32. The coil sheath helps to prevent kinking of the spring 32 when it is compressed, for example, when operating the strain wire 33 to disconnect the docking sleeve 303 from the collet 22.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

We claim:

1. A pipe stopper, comprising:

an elongate resilient body member;

at least one sealing member for sealing the pipe stopper to a pipe, the at least one sealing member positioned around a circumference of the body member; and a guide member extending from a leading end of the pipe stopper for guiding the pipe stopper around a bend in the pipe;

wherein each sealing member comprises a circumferential flange and a sealing washer, the sealing washer having a flexible circumferential edge region that provides a relatively low resistance to insertion of the stopper in the pipe, but which, when the pipe stopper is pulled back a short distance, deforms and folds into engagement with the flange and an internal wall of the pipe forming a seal.

2. The pipe stopper according to claim 1, wherein the sealing member comprises a plurality of circumferential fins or flanges arranged along a length of the body member providing an interference fit in the pipe.

3. The pipe stopper according to claim 1, wherein the flange slides relatively easily within the internal bore of the pipe, and the sealing washer abuts or is adjacent a trailing face of the flange, the sealing washer being an interference fit within an internal bore of the pipe or conduit, and having a flexible circumferential edge region adapted to be deformed or folded when the pipe stopper is inserted into the pipe and moved towards its operative position, such that the circumferential edge region of the sealing washer is deformed or folded away from the flange when the stopper is inserted into the pipe, and is deformed or folded into contact with the flange by frictional engagement with the internal wall of the pipe, when the stopper is pulled back a short distance along the pipe or conduit forming a seal between the flange and the internal wall of the pipe.

4. The pipe stopper according to claim 1, wherein a diameter of the sealing washer is from 10 to 30% greater than a diameter of the flange.

5. The pipe stopper according to claim 1, wherein a trailing face of the sealing washer is provided with a sealing compound on at least the flexible circumferential edge region thereof.

6. The pipe stopper according to claim 1, wherein the guide member comprises a guide cap, mounted on the front or leading end of the pipe stopper.

7. The pipe stopper according to claim 6, wherein the cap has a generally conical shape.

8. The pipe stopper according to claim 7, wherein the cap has a cone angle of from 90° to 170°.

9. The pipe stopper according to claim 1, wherein the body member has a central strain member.

10. The pipe stopper according to claim 9, wherein the central strain member comprises a wire extending along a longitudinal axis of the body member.

11. A pipe stopper capable of moving along a pipe and blocking the pipe at a point remote from an access point, comprising:

an elongate resilient body member selected from a group consisting of resilient and elastomeric material, the body member being provided with a resilient reinforcing member, the resilient reinforcing member comprising a resilient coil spring in a wall of the body member;

a plurality of circumferential sealing members spaced along a length of the body member for sealing the pipe stopper to the pipe; and a guide member extending from a leading end of the pipe stopper for guiding the pipe stopper around a bend in the pipe.

12. A pipe stopper, comprising:

an elongate resilient body member;

at least one sealing member for sealing the pipe stopper to a pipe, the at least one sealing member positioned around a circumference of the body member;

a guide member extending from a leading end of the pipe stopper for guiding the pipe stopper around a bend in the pipe;

retrieval means for retrieving the pipe stopper by moving the pipe stopper along the pipe; and engagement means positioned on the pipe stopper for cooperatively engaging with the retrieval means.

13. The pipe stopper according to claim 12, wherein the engagement member comprises a collet positioned at the rear or trailing end of the pipe stopper, the collet capable of cooperating with a docking sleeve on the retrieval member.

14. The pipe stopper according to claim 12, further comprising a docking cone for positioning the engagement member and the retrieval member.

15. A pipe stopper capable of blocking a pipe at a remote location, comprising:

an elongate body member;

a coil spring embedded in a wall of the body member for reinforcing the body member;

sealing means positioned around a circumference of the body member for sealing the pipe stopper to the pipe;

guiding means mounted on a front end of the pipe stopper for guiding the pipe stopper around a bend in the pipe;

means for positioning and retrieving the pipe stopper; and engaging means positioned at a rear end of the pipe stopper for engaging the positioning and retrieving means so that the pipe stopper can be moved to the remote location in the pipe.

16. The pipe stopper according to claim 15, wherein the guiding means comprises a flexible spring and an end cap.

17. The pipe stopper according to claim 15, wherein the engaging means comprises a collet and the positioning and retrieving means comprises a docking sleeve for cooperating with the collet.

* * * * *